US011489877B2

(12) United States Patent
Jeffery et al.

(10) Patent No.: US 11,489,877 B2
(45) Date of Patent: Nov. 1, 2022

(54) CYBERSECURITY MATURITY DETERMINATION

(71) Applicant: International Business Machines Corporation, Armonk, NY (US)

(72) Inventors: Eric Jeffery, Monument, CO (US); Shikhar Kwatra, Research Triangle Park, NC (US); Adam Lee Griffin, Dubuque, IA (US); Jason Horowitz, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 16/854,105

(22) Filed: Apr. 21, 2020

(65) Prior Publication Data

US 2021/0329033 A1 Oct. 21, 2021

(51) Int. Cl.
*H04L 9/40* (2022.01)
*G06N 20/00* (2019.01)

(52) U.S. Cl.
CPC ............ *H04L 63/20* (2013.01); *G06N 20/00* (2019.01)

(58) Field of Classification Search
None
See application file for complete search history.

(56) References Cited

U.S. PATENT DOCUMENTS 10,387,423 B2 * 8/2019 Woo .................... G06F 16/2477
10,467,419 B1 11/2019 Youngberg et al.
10,771,506 B1 * 9/2020 Kumar .................... H04L 63/02
2019/0052664 A1 2/2019 Kibler et al.
2019/0207968 A1 * 7/2019 Heckman ............ H04L 63/1425
2021/0075794 A1 * 3/2021 Gazit .................. H04L 63/1408

FOREIGN PATENT DOCUMENTS

EP 0999489 A2 5/2000
WO 2019135951 A1 7/2019

OTHER PUBLICATIONS

Capellupo et al, "Security and Attack Vector Analysis of IoT Devices" International Conference on Security, Privacy and Anonymity in Computation, Communication and Storage SpaCCS 2017: Security, Privacy, and Anonymity in Computation, Communication, and Storage pp. 593-606.
Chatterjee et al., . "An iterative learning and inference approach to managing dynamic cyber vulnerabilities of complex systems." Reliability Engineering & System Safety 193 (2020): 106664.
Conforti et al., "Supporting Risk-Informed Decisions during Business Process Execution" C. Salinesi, M.C. Norrie, and O. Pastor (Eds.): CAiSE 2013, LNCS 7908, pp. 116-132, 2013.
Tsu, "How to build confidence." booksite.elsevier.com (2011).

* cited by examiner

*Primary Examiner* — Cai Y Chen

(57) ABSTRACT

An example operation may include one or more of receiving data from a plurality of sources associated with an entity, clustering the data into security-related topics, determining, via one or more machine learning models, maturity values of the entity for the security-related topics, respectively, and generating recommendations to improve the determined maturity values of the entity, wherein the maturity values relate to a level of security of the entity with respect to the security-related topics.

18 Claims, 12 Drawing Sheets

| Maturity Level Descriptions | | | | |
|---|---|---|---|---|
| Basic | Managed | Defined | Quantitative | Optimized |
| **Level 1** | **Level 2** | **Level 3** | **Level 4** | **Level 5** |
| Capabilities are undocumented, in a state of change, ad-hoc, uncontrolled and reactive. Makes for chaotic or unstable environment | Capabilities are repeatable and when used provide consistent results. Standardization is unlikely and bypassed frequently in times of stress | Capabilities are defined, documented, and standardized with moderate degrees of improvement over time and are consistent to a department or a team but still subject to instabilitiy | Capabilities are well standardized and cross-functional and make effective use of metrics to enable staff and management to effectively execute, monitor, and manage people, processes and tech | Capabilities are continually improving through incremental planned improvements. Tech, processes, and governance are cross-functionally integrated with shared goals and objectives |

Maturity Values

410

| Capability | Current | Target | Capability | Current | Target |
|---|---|---|---|---|---|
| **Insight** | **1.6** | **2.0** | **Detection** | **1.4** | **1.8** |
| Asset Mgmt. | 2.2 | 2.5 | Monitoring | 1.8 | 2.3 |
| Threat Intel. | 1.8 | 1.8 | Security Mgmt. | 1.3 | 2.0 |
| Vuln. Mgmt. | 2.0 | 2.3 | User Analytics | 1.3 | 1.8 |
| Data Security | 1.0 | 1.5 | Threat Detect. | 1.2 | 1.2 |
| 3rd Party Risk | 1.2 | 1.7 | **Response** | **1.5** | **2.0** |
| **Prevention** | **2.3** | **2.5** | Incident Mgmt. | 1.5 | 2.0 |
| Patch Mgmt. | 2.3 | 2.3 | Forensics | 1.5 | 2.0 |
| App. Security | N/A | N/A | **Recovery** | **2.8** | **3.0** |
| Identity Mgmt. | 2.2 | 2.3 | Disaster Recov. | 2.8 | 3.0 |
| Network Security | 2.3 | 2.8 | | | |
| Endpnt. Security | 2.3 | 2.7 | | | |

Recommendations

420

- Conduct use case review and optimization to improve coverage of security content within various alerting platforms . . .
- Overhaul current metrics and reporting function to improve leadership and operational dashboards . . .
- Conduct security review to determine appropriate security controls for hosted applications / data . . .
- Analyze alternative 3rd party threat monitoring providers for improved services

420

430

520

600

CYBERSECURITY MATURITY DETERMINATION

BACKGROUND

Organizations use computers, computer networks, the Internet, and other equipment and networks, on a d daily basis. Over time, both the systems and the environments in which they operate grow in complexity and capability. Given the complexities and the scale of larger systems, malicious actors are often finding new ways to gain unauthorized access to an organization's data.

SUMMARY

One example embodiment may provide an apparatus that includes a processor configured to perform one or more of receive data from a plurality of sources associated with an entity, cluster the data into security-related topics, determine, via one or more machine learning models, maturity values of the entity for the security-related topics, respectively, and generate recommendations to improve the determined maturity values of the entity, wherein the maturity values relate to a level of security of the entity with respect to the security-related topics.

Another example embodiment may provide a method that includes one or more of receiving data from a plurality of sources associated with an entity, clustering the data into security-related topics, determining, via one or more machine learning models, maturity values of the entity for the security-related topics, respectively, and generating recommendations to improve the determined maturity values of the entity, wherein the maturity values relate to a level of security of the entity with respect to the security-related topics.

A further example embodiment may provide a non-transitory computer-readable medium comprising instructions, that when read by a processor, may cause the processor to perform one or more of receiving data from a plurality of sources associated with an entity, clustering the data into security-related topics, determining, via one or more machine learning models, maturity values of the entity for the security-related topics, respectively, and generating recommendations to improve the determined maturity values of the entity, wherein the maturity values relate to a level of security of the entity with respect to the security-related topics.

BRIEF DESCRIPTION OF THE DRAWINGS

FIG. 3B is a diagram illustrating maturity value descriptions according to example embodiments.

FIG. 4A is a diagram illustrating a user interface displaying maturity values and recommendations according to example embodiments.

DETAILED DESCRIPTION

Figure 1A:
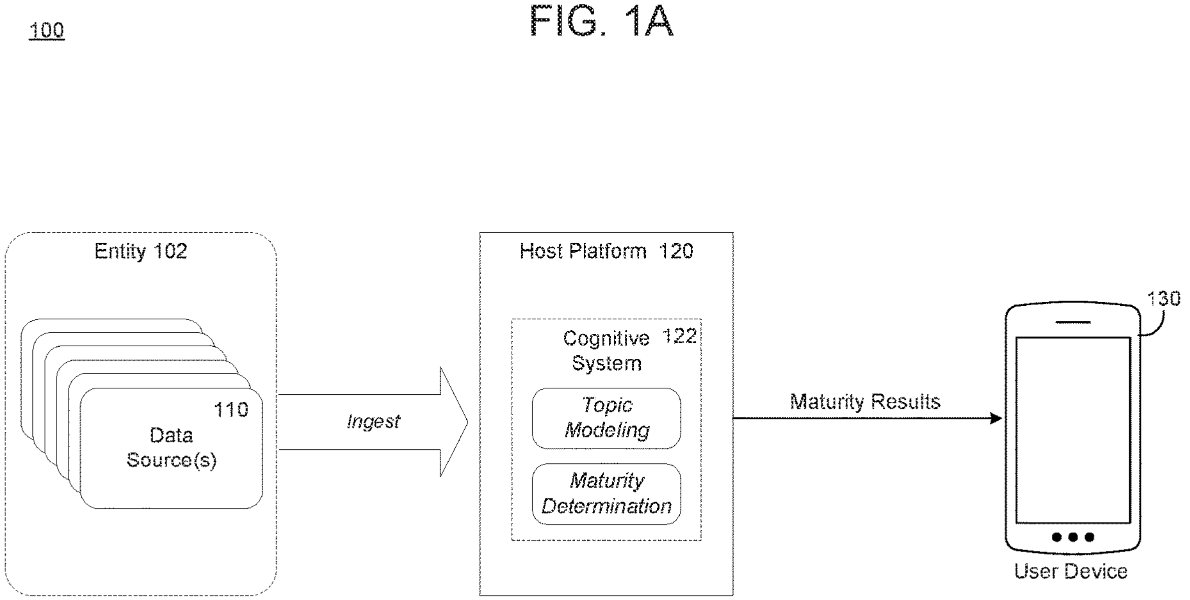
FIG. 1A is a diagram illustrating a computing environment for determining the maturity of a cybersecurity system according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

In an effort to protect against various malicious actors and threats, defense mechanisms can be implemented to secure an organization's network and equipment. Such mechanisms can include identification and authentication, auditing, spyware installation, firewalls, cryptography, digital certificates, and the like.

Example embodiments provide methods, systems, components, non-transitory computer readable media, devices, and/or networks, which are directed to a cognitive solution that provides a comprehensive understanding of cyber security practices of an entity with respect to best known practices. In one embodiment, the solution is embodied in a solution (for example, a tool, an application, etc.) which can expose a maturity of an organization's cyber security practices across multiple areas and provide recommendations for improvement of those practices.

An organization's cyber defense posture is a journey that evolves along with the systems, networks, processes, and users of the organization. Due to the complexities that may be included within a computing environment, cyber defense of the computing environment is often implemented based on a familiarity and an understanding of an organization's Information Technology professionals. As a result, most organizations are unaware of how their defense compares to the best practices within the industry or against other metrics. Instead, they rely on the subjective understanding of a few people. Thus, organizations can lack important insight into potential issues than can compromise their systems, people, and processes and how they can be better protected.

In one embodiment, the cognitive system described herein may receive data from different sources of an organization that are related to a computing environment, processes, staff, and the like. For example, the cognitive system may receive inputs via a user interface, reporting or log files, policy descriptions, training documents, descriptions of current processes, internal conversations, emails, messages, runbooks, employee skills assessments, and the like, and learn about an organization from the ingested data. For example, the cognitive system may ingest text content from different organizational sources such as manual user inputs, documentation, training materials, and the like, and execute a machine learning model on the text data which can identify a level of maturity of the organization with respect to a plurality of different security-related topics. The cognitive system may cluster the data into smaller subsets of data that are based on security-related topics. In some cases, the topics may be predefined. As another example, the topics may be modeled based on the ingested data, which may also be verbally received. Furthermore, the cognitive system may process the topic data using one or more machine learning models which output a maturity value (e.g., a score) for each topic.

For example, the cognitive system may use an ensemble of machine learning algorithms in which a first algorithm identifies term frequencies of predefined keywords that are associated with particular topics, and a second algorithm performs a sentiment analysis of the keywords. The machine learning model and the algorithms may be stored within a tenant environment of a host platform. For example, the tenant may be an instance of the host platform that is dedicated to the organization. The output may include a numerical value or score representing a maturity level of the organization's cyber security with respect to a particular topic. The algorithm ensemble may perform the same analysis for multiple different topics at once, resulting in multiple different maturity values for multiple different cyber security topics being output. The maturity values may be scaled into scores and/or visuals that are easy to comprehend. In addition, the cognitive system may determine recommendations for improving the maturity of an organizations cyber security system based on best practices within the industry, and output the determined recommendations with the maturity scores and/or the visuals.

The cognitive system may continuously update the ingested data and the maturity values of the security-related topics thereby providing a live score of the entity's cyber security abilities. For example, the cognitive system may receive additional conversations, documentation, training materials, logs, and the like, and repeat the machine learning process for the plurality of topics thereby updating the maturity scores for the organization. Here, the cognitive system may provide maturity values for different topics at different rates over time based on which input data is updated.

Some of the benefits provided by the example embodiments include exposing weaknesses within an organizations' cyber security practices based on best practices within the industry. Furthermore, the example embodiments can also identify which specific cyber security topics are more in need of help than others. In addition, the example embodiments also provide recommendations for improving the cyber security in these topic areas.

FIG. 1A illustrates a computing environment 100A for determining the maturity of a cyber security system of an entity according to example embodiments. Referring to FIG. 1A, the computing environment 100A includes a host platform 120 which includes a cognitive system 122 and which is configured to ingest data of an entity or source 110 (e.g., a company, an organization, a business, a person, a place, etc.) and perform a maturity evaluation of the entity's cyber security defense practices. In this example, the cognitive system 122 may include software running in a tenant instance of the host platform 120. In some embodiments, the cognitive system 122 may also include dedicated hardware where the software is stored and executed. The host platform 120 may be a cloud platform, a web server, an on-premises server, a database, a workstation, a user device, or the like. The cognitive system 122 on the host platform 120 may host a cyber security maturity model (implemented within a software application) which includes the embodiments described herein. The entity may have its own computing environment (network, computers, mobile devices, firewalls, software processes, etc.), processes, and people which interact with the cognitive system 122 on the host platform 120. The cognitive system 122 via the host platform 120 may collect data of the entity from the computing environment, processes, and people from different data sources 110.

For example, the data sources 110 may include text data (e.g., unstructured text data) from various company-based sources such as emails, messages, training manuals, user conversations with a chatbot, user inputs via a user interface, log files logging network data, log files of computing systems, employee skill descriptions, process information, application patch management data, and the like. The data sources 110 may also include audio, video, images and the like. There is no limit to the data sources 110 or the type of information they can provide. The cognitive system 122 may analyze the data from the data sources 110 and cluster the data into smaller sets (subsets) based on topic, field, area, etc. which is simply referred to as topics. Here, the cognitive system 122 may convert the raw text data into vectors. Also, the cognitive system 122 may use various topic modeling techniques, such as the Latent Dirichlet allocation. The cognitive system 122 may cluster the vector data into the modeled topics.

The cognitive system 122 may store and run a machine learning model which includes one or more machine learning algorithms for determining a current maturity state of the entity for each of the topics based on the text data within the clusters. For each topic, the machine learning model may process the word vectors using one or more machine learning algorithms that have been trained to predict a value of maturity from the vector data. The machine learning model may include an algorithm which identifies a frequency of use of various keywords that are associated with a particular topic. For example, the term "firewall" may be a keyword for the topic of network security. As another example, the term "multi-factor authentication" may be a keyword for the topic identity and access management.

The machine learning model may also include an algorithm which performs a sentiment analysis with respect to the keywords. For example, the sentiment analysis, described in further detail below, may be trained to identify whether the entity has advanced capabilities with respect to a topic or is lacking in capabilities with respect to the topic. Based on this algorithm ensemble, the machine learning model may output a value representing the maturity of a topic. The machine learning model may perform this same process for all topics at the same time resulting in a plurality of maturity values being output. In some embodiments, the maturity values may be scaled to create scores that are easier to understand for a user. The scores may represent a predicted maturity of the entity for topics with respect to a predetermined baseline of maturity (e.g., best practices in the industry, etc.).

The host platform 120 may output the maturity values to a user interface displayed on a user device 130, which may be a wireless device or a wired device (not shown). For example, the cognitive system 122 via the host platform 120 may output the maturity values within a user-friendly interface such as a score sheet (e.g., FIG. 4A), a scatter plot (e.g., FIG. 4B), or the like. The maturity values may be based on predefined maturity levels (e.g., FIG. 3B) which correspond to maturity values. In some embodiments, the cognitive system 122 may also generate recommendations for improving the maturity values of the entity based on predefined rules which may be output by the host platform 120. Here, a maturity value below a predetermined threshold may be paired with a recommend action. For example, a low maturity value for the topic "application security" may trigger a recommendation to evaluate security controls for hosted applications. As another example, a low maturity value for "threat intelligence" may trigger a recommendation to conduct training at leadership and operational levels for a specific threat landscape.

Figure 1B:
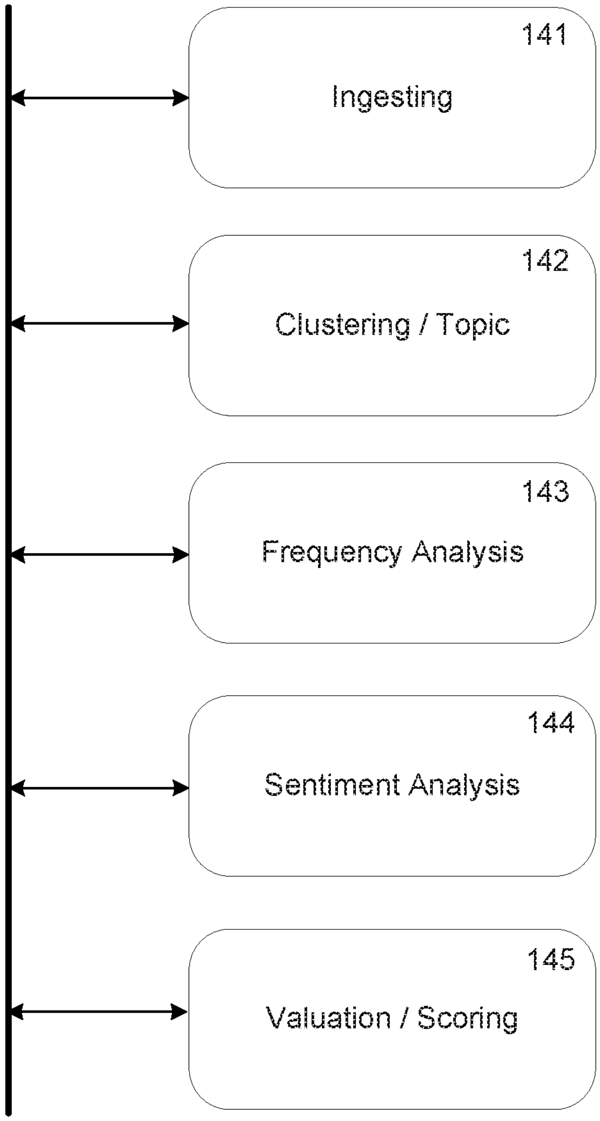
FIG. 1B is a diagram illustrating a process of determining maturity values for an entity according to example embodiments.

FIG. 1B illustrates a process 100B of determining maturity values for an entity according to example embodiments. For example, the process 100B may be performed by the cognitive system 122 on the host platform 120 shown in FIG. 1A. Referring to FIG. 1B, in 141, the cognitive system 122 may perform one or more of: ingest data from the data sources 110 (e.g., log files, conversations, documents, spreadsheets, files, etc.). In 142, the cognitive system 122 may cluster text data within the ingested data into a plurality of topics. Here, the cognitive system 122 may divide the ingested data into particular topics thereby breaking up a large corpus of data into smaller subsets of data where each subset is designated to a specific topic.

In 143, the cognitive system 122 may perform a frequency analysis using a first algorithm within a machine learning model. For example, the cognitive system 122 may convert the text into vectors (numbers) and execute a frequency algorithm such as term frequency-inverse document frequency (TF-IDF), or the like, which identifies a frequency of use of various keywords. In some cases, the keywords may be weighted, where some keywords have more weight on the overall maturity value determination than others. In 144, the cognitive system 122 may perform a sentiment analysis using a second algorithm within the machine learning model. For example, the cognitive system 122 may execute a natural language processing (NLP) algorithm on the keywords to identify a sentiment of the users of the entity towards the keywords. The sentiment may determine a capability, importance, etc., of a topic with respect to a particular organization. For example, a keyword/phrase may include "data security." The sentiment analysis may detect a phrase "data security is very crucial and the system cannot operate without this feature." Here, the NLP algorithm may determine a higher score than if the sentiment analysis detected a phrase such as "data security is not as important as accessibility" within the ingested data.

In 145, the cognitive system 122 may detect the output maturity values for the entity on a plurality of topics from the machine learning model (e.g., the algorithm ensemble processed in steps 143 and 144), scale the maturity values into user friendly scores, and output the scaled maturity values for display. Although not shown in FIG. 1B, it should be appreciated that the cognitive system 122 may continuously repeat the process 100B (e.g., a continuing or periodic loop) based on updated data being ingested from the data sources 110. Thus, a continuous maturity evaluation can be performed. For example, the cognitive system 122 may continuously ingest (or re-ingest) data to provide a delta variation in the clustered data sets with updated data and provide a live and varied change to the maturity value as updates in the entity's cyber security system are detected. In other embodiments, the cognitive system 122 may repeat one or more steps of the process 100B depending on a variety of factors including a type of data being ingested, a rate of the ingestion, results or outputs of the clustering, frequency analysis and sentiment analysis. etc. Further, the functions described herein, may be performed by one or more of the algorithms described herein.

Figure 2:
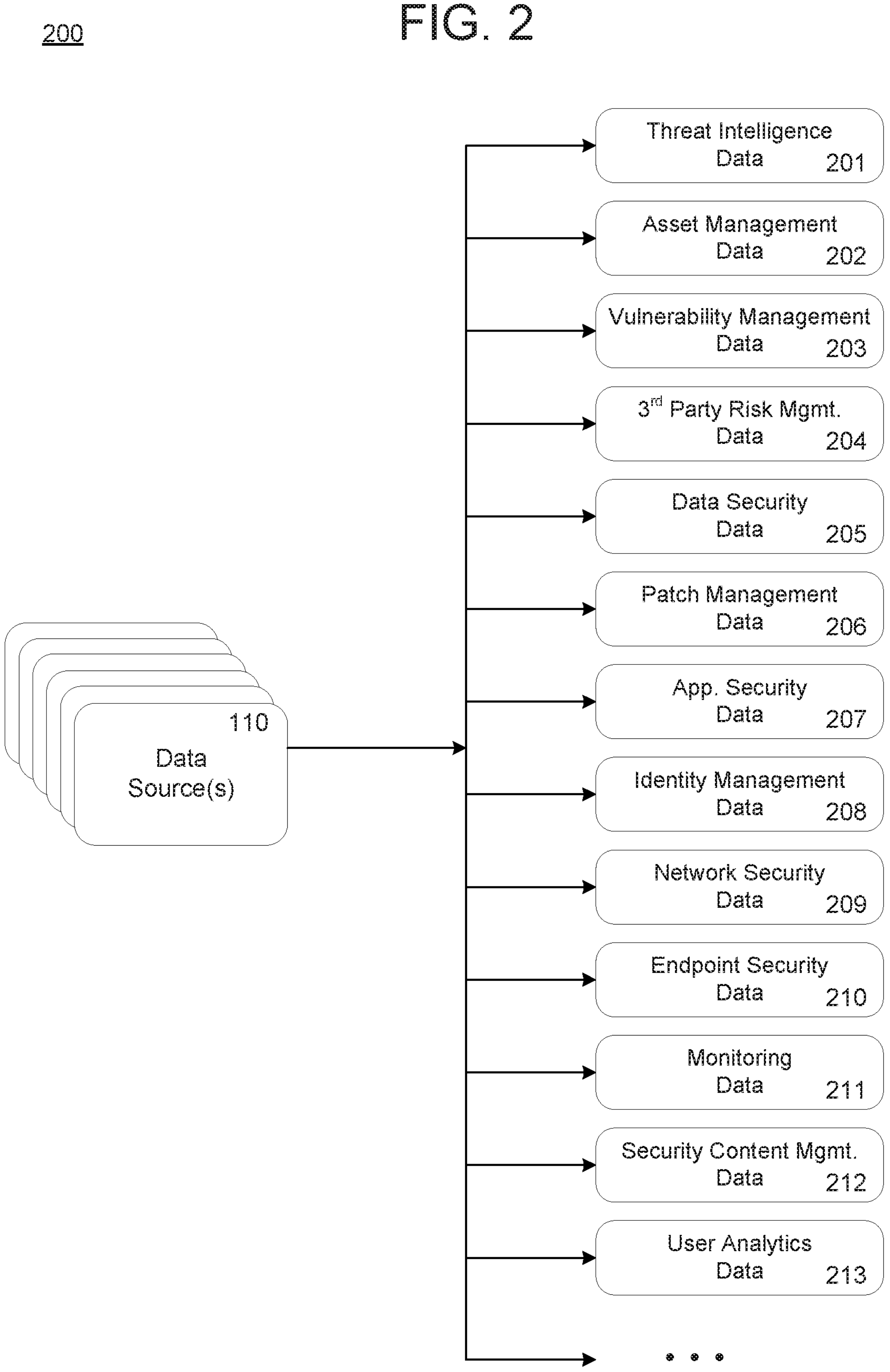
FIG. 2 is a diagram illustrating a process of clustering entity data among a plurality of topics according to example embodiments.

FIG. 2 illustrates a process 200 of clustering entity data among a plurality of topics according to example embodiments. For example, the process may be performed by the host platform 120 based on the input data from data sources 110. Here, the software tool may receive the data from the data sources 110, and divide the data into a plurality of different topics 201-213, and the like.

As previously described, the data that is ingested by the host platform may come from various data sources. For example, data may be manually input by installers that provide software version information, staff levels, utilization of processes, etc. Data may also be provided from documentation, ERP systems, human resource systems, log files, and the like. After initial deployment, the host platform may parse documentation for updates/lack thereof. Also, the host system may receive updates through manual inputs, log files, and the like. The ingested information may include employee information on the number of employees performing tasks, their skill level and tenure. The host system may read data from known and unknown systems, new file formats and old. By capturing data broadly and ingesting data from disparate systems, the host system can provide a more accurate and inclusive maturity value.

The resulting data may be accumulated or otherwise aggregated into a corpus that can be divided or broken-up into smaller clusters where each cluster is dedicated towards a topic of a cyber security system. In the example embodiments, the clustering may be performed by a topic modeling algorithm such as K-means clustering or the like. The topics (or groups) may be security-related topics, however embodiments are not necessarily limited thereto. Examples of the topics include threat intelligence, asset management, vulnerability management, third party risk management, data security, patch management, application security, identity and access management, network security, endpoint security, user analytics, monitoring, and the like. These are just a few of the possible topics, and should not be construed as limiting.

Figure 3A:
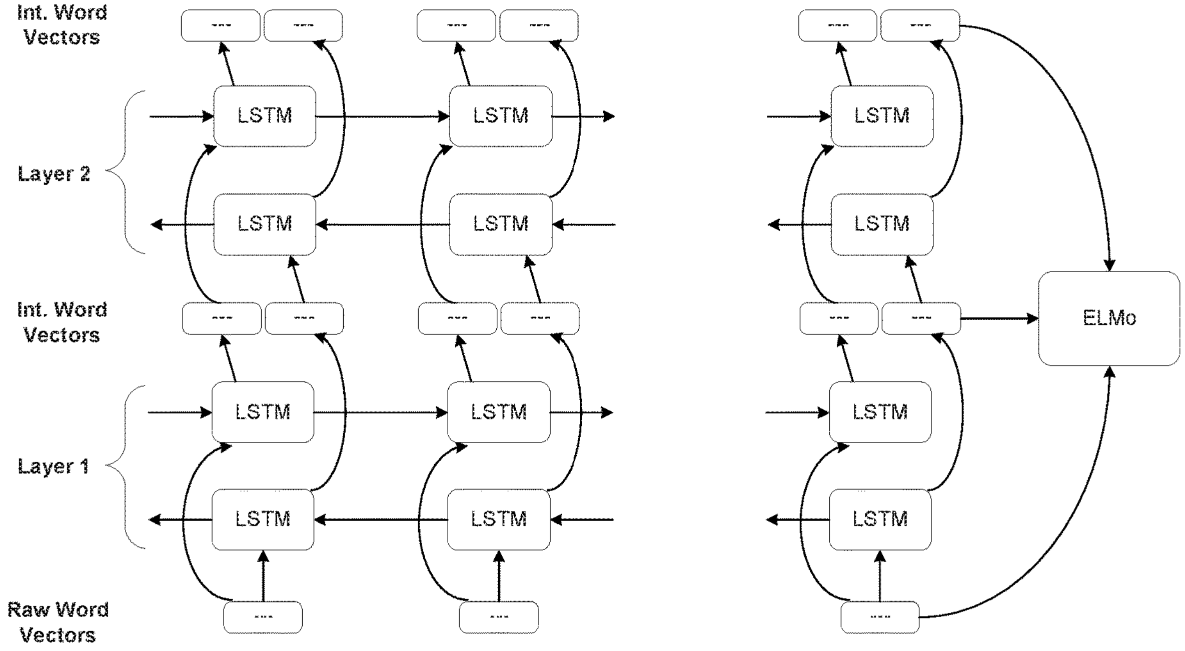
FIG. 3A is a diagram illustrating a machine learning model for determining maturity values according to example embodiments.

FIG. 3A illustrates a machine learning model 300A for determining maturity values according to example embodiments. As previously described, the ingested data may be converted into vectors and then assigned to clusters (smaller groups). The topics (e.g., a topic taxonomy) may be fed or input to a neural network as shown FIG. 3A. For example, the machine learning model 300A may be stored within a program that is deployed and/or running on a tenant instance of the host platform 120. During execution, information from the organization may automatically be uploaded or fed into the machine learning model 300A from a workstation, service, user device, etc. of the organization. In this example, layer 1 and layer 2 of the neural network model comprise long short-term memories (LSTMs) which perform mathematical transformations on words and/or sequences of words to perform model training. Meanwhile, an Embeddings from Language Model (ELMo) is a deep contextualized word representation that models both complex characteristics of word use (e.g., systems and semantics) and how these uses vary across linguistic contexts (i.e., to model polysemy). The word vectors are learned functions of internal states of a deep bi-directional language model (biLM) which is pre-trained on a large text corpus.

The output of the machine learning model 300A provides raw maturity values which identify a maturity level of each topic area. For continuous learning, the output may provide updated maturity values which represent difference in improvements done in different topic areas along with conditional flags for areas that may be affected. The conditional flags may be generated by testing and monitoring an organization's documents, websites, and the like. As another example, the conditional flags may be input within feedback information shared into the system by users. The conditional flags may be fed or input into the machine learning model 300A.

In some embodiments, the outputs from the machine learning model 300A may be scaled to generate scores that are based on maturity levels shown in FIG. 3B. In this example, the maturity levels include numbers 1 through 5. These numbers may correspond to a score between 1 to 5 where the level 5 corresponds to the highest possible score and the level 1 corresponds to the lowest possible score. However, it should be appreciated that these scoring numbers are arbitrary and may be any desired numbers or other values. As another example, scaling may not be performed and the raw output of the machine learning model 300A may be used as a maturity value.

FIG. 3B illustrates example maturity value descriptions 310. Referring to FIG. 3B, the levels start with a basic level of cyber security maturity (level 1) and range to an optimized level of cyber security maturity (level 5). In this example, the different maturity levels 314 include labels 312 which can provide users with an easy understanding of how the capabilities 316 of their organization are doing with respect to best practices of a cyber security system.

In this example, the first level of maturity represents the least mature cyber security system with instability within the environment. The second level of maturity represents a managed cyber security maturity where the capabilities of the cyber security system are consistent but often overlooked in times of high volume, demand, stress, etc. The third level of maturity represents standardized cyber security practices with improvements occurring over time but still with some instability. The fourth level of maturity represents well standardized capabilities and cross-functional. The fourth level often makes use of metrics to enable staff and management to understand areas of concern and effectively monitor and manage people. Meanwhile, the fifth level of maturity is the optimal maturity level with well-defined incremental improvements, cross-functional tech practices and governance, and integrated goals and objects across the organization.

Figure 3C:
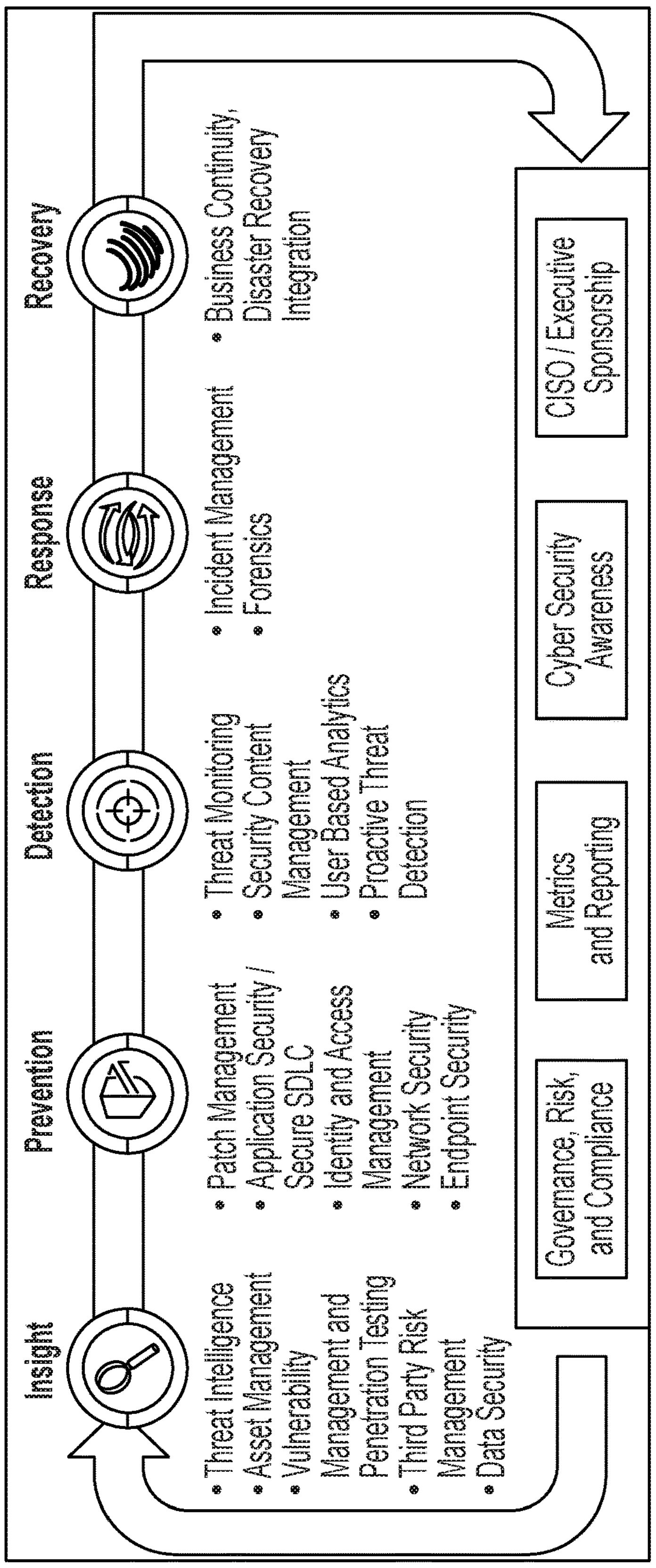
FIG. 3C is a diagram illustrating a process of assigning organizational data to security-related topics according to example embodiments.

FIG. 3C illustrates a process 320 of assigning organizational data to security-related topics according to example embodiments. Referring to FIG. 3C, the organizational data may be ingested from various sources including, but not limited to, documents, emails, training manuals, company brochures, reporting metrics, compliance data, executive sponsorship data, etc. In some cases, the organizational data may be input via a user interface. The system 122 groups the data into security-related topics.

Examples of the security-related topics include threat intelligence, asset management, vulnerability management, third-party risk management, data security, patch management, application security, identity and access management, network security, endpoint security, threat monitoring, security content management, user analytics, proactive threat detection, incident management, forensics, business continuity and disaster recovery, and the like. Also, the security-related topics may be clustered into categories such as insight, prevent, detection, response, and recovery. The security-related topics, the categories, and the groupings are just examples and should not be construed as limiting to the example embodiments.

FIG. 4A illustrates a user interface 400A displaying maturity values 410 and recommendations 420 according to example embodiments. Referring to FIG. 4A, the cognitive system may generate a maturity value (score) for each of a plurality of different topics. In the example of FIG. 4A, the maturity values 410 are scored for 17 topics which are included within five different categories (insight, prevention, detection, response, and recovery). The cognitive system may group the topics into the categories for easier understanding by the user/viewer. For example, the insight category may include the topics of asset management, threat intelligences, vulnerability management, data security, and third-party risk assessment. Meanwhile, the detection category may include the topics of monitoring, security management, user analytics, and threat detection. The topics and the categories may be predetermined or modeled from the ingested data, and are not limited to the examples shown and described herein.

Each topic and category includes a current score and a target score which represents what the score could become if recommendations and/or improvements are made over the course of a predetermined period of time (e.g., minutes, hours, days, weeks, years, etc.). For example, the category may be scored based on an aggregation of the topics assigned to the category. In this example, one target score is shown, but the system may display multiple target scores to which an entity can aspire to over the course of different periods of time. For example, the cognitive system could display a target score for 1 year in the future and a target score for 3 years into the future, etc.

It should also be appreciated that the outputs of the maturity values 410 may be graphed or provided in different visual implementations and is not to be limited to the scores shown in the example of FIG. 4A.

Furthermore, the cognitive system may determine recommendations 420 based on the maturity values 410 for the entity. For example, the recommendations 420 may be triggered by rules that are based on the best practices or guidelines within an industry that is associated with and includes the entity. The best practices may include information from baselines of best practices which are gathered from documents and/or online scraping of data pertaining to the security-related topics. Here, a topic receiving a maturity value below a predetermined threshold may be a condition that triggers a recommendation by the cognitive system. In the example of FIG. 4A, the topic of data security receives a very low score of 1.0. In this example, the low data security score triggers a recommendation to conduct a use case review and perform optimization of alerting systems.

In this example, the system may ingest information and compare it with different baselines. The maturity values may be generated and compared to predetermined thresholds. The recommendations may be stored within rules where a maturity value that deviates a predetermined amount from a certain threshold triggers a predefined recommendation. In another example, the topic of user analytics received a low score of 1.3. In this example, the low user analytics score triggers a recommendation to overhaul the current analytical metrics and reporting functions being used. In some embodiments, the system may also monitor to see if the recommendations are followed by monitoring changes along a time series window pattern. The system may detect a delta difference in performance by scraping entity data and rerunning the machine learning model.

Figure 4B:
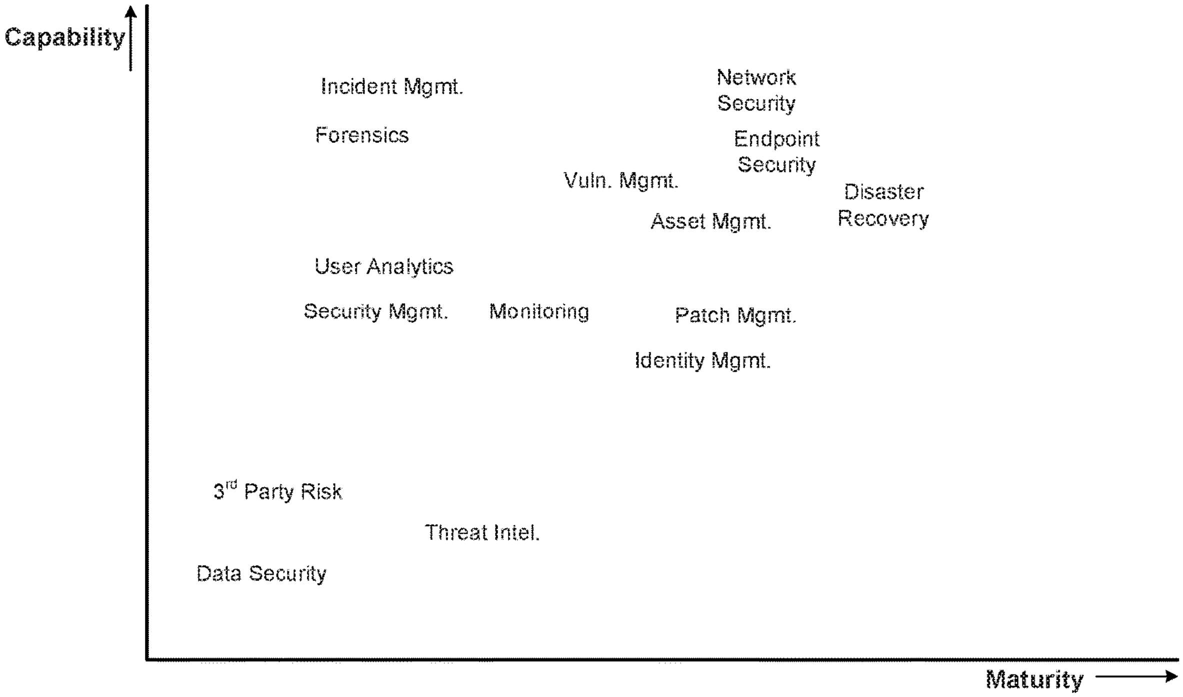
FIG. 4B is a diagram illustrating a graph of security attributes plotted based on capability and maturity according to example embodiments.

FIG. 4B illustrates a graph 400B of security attributes plotted based on capability and maturity according to example embodiments. Referring to FIG. 4B, the cognitive system may identify an entity's capability and an entity's maturity for each topic. Using the capability component and the maturity component, the topic (e.g., a label of the topic) can be plotted on the graph 400B where the Y-axis represents a value of capability and the X-axis represents a value of maturity. Thus, a viewer can easily understand which topics are more mature and more capable versus which topics are not. The maturity component and the capability component may be identified by the machine learning model described herein.

In the example of FIG. 4B, placement on the graph 400B may occur based on the score output by the machine learning model. The model may use the maturity values for each topic and place an identifier of the topic in a scatter plot based on score in relation to others as shown in FIG. 4B. Thus, all topics may receive a score and receive placement on the graph 400B in relation to each other. The higher the scores, the further up and to the right the identifiers will be. As another example, the model may establish two scores for each of capability and maturity by relating them to one another which provide precise numeration for capability and maturity by creating a range and placing accordingly. For example, maturity on a scale of 1-10 may be determined based on the score of a component and that item may receive placement accordingly. A similar determination and placement may occur with capability. As a non-limiting example, a topic of cyber threat intelligence (CTI) may receive an overall score of 3.5 which could include a maturity component score of 7.5 in relation to other components and/or other organizations utilizing this scoring model. Meanwhile, the capability component score may be a value of 5 because other components scored have more capacity to deliver security and the model determines that CTI may not receive credibility credence over other components such as AI or automation.

Figure 4C:
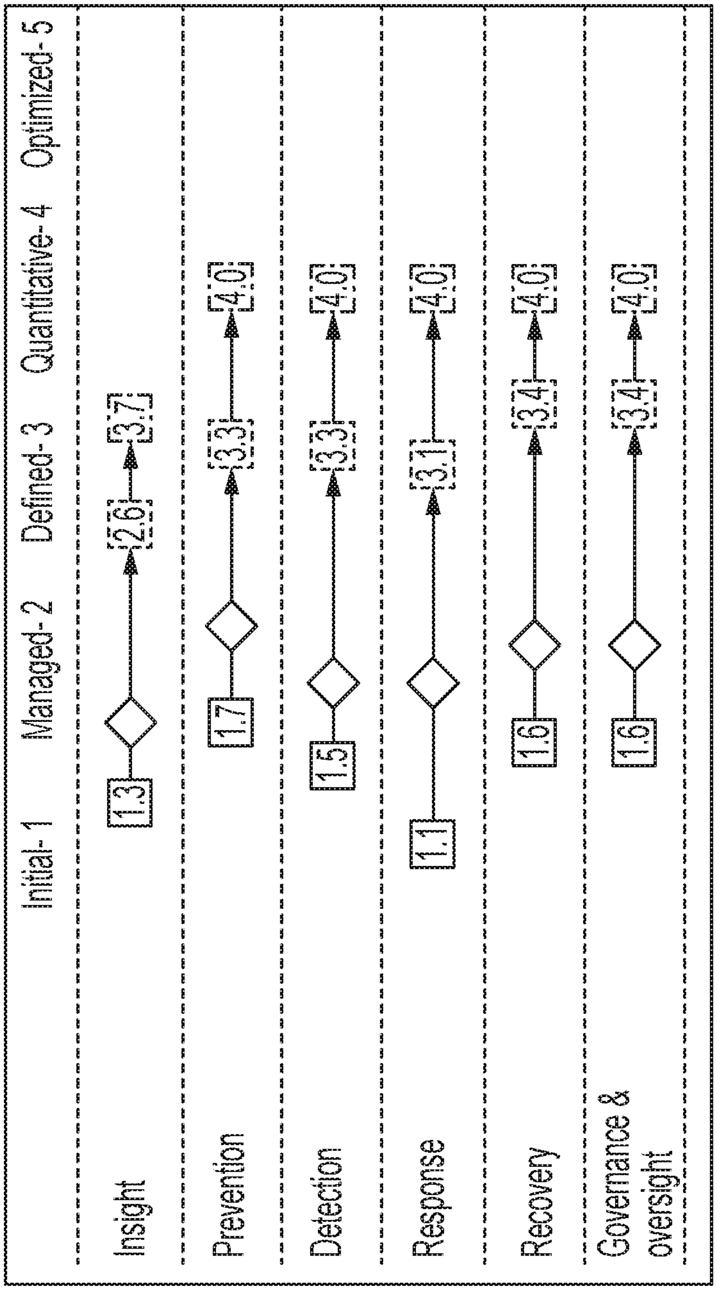
FIG. 4C is a diagram illustrating a graph of maturity values for different categories of security-related topics according to example embodiments.

FIG. 4C illustrates a graph 430 of maturity values for different categories of security-related topics according to example embodiments. Referring to FIG. 4C, the graph 430 includes resulting scores for each category graphed on a scale of one to five, with respect to each other. In this example, the categories correspond to some of the categories in FIG. 4A such as insight, prevention, detection, response, recovery, and governance/insight, which each include one or more security-related topics assigned thereto. Each category includes its current score, a projected score for one year into the future, and a projected store for three years into the future. The projected scores may be predicted by the machine learning model based on the suggested recommendations by the system being complied with by the organization.

Figure 5A:
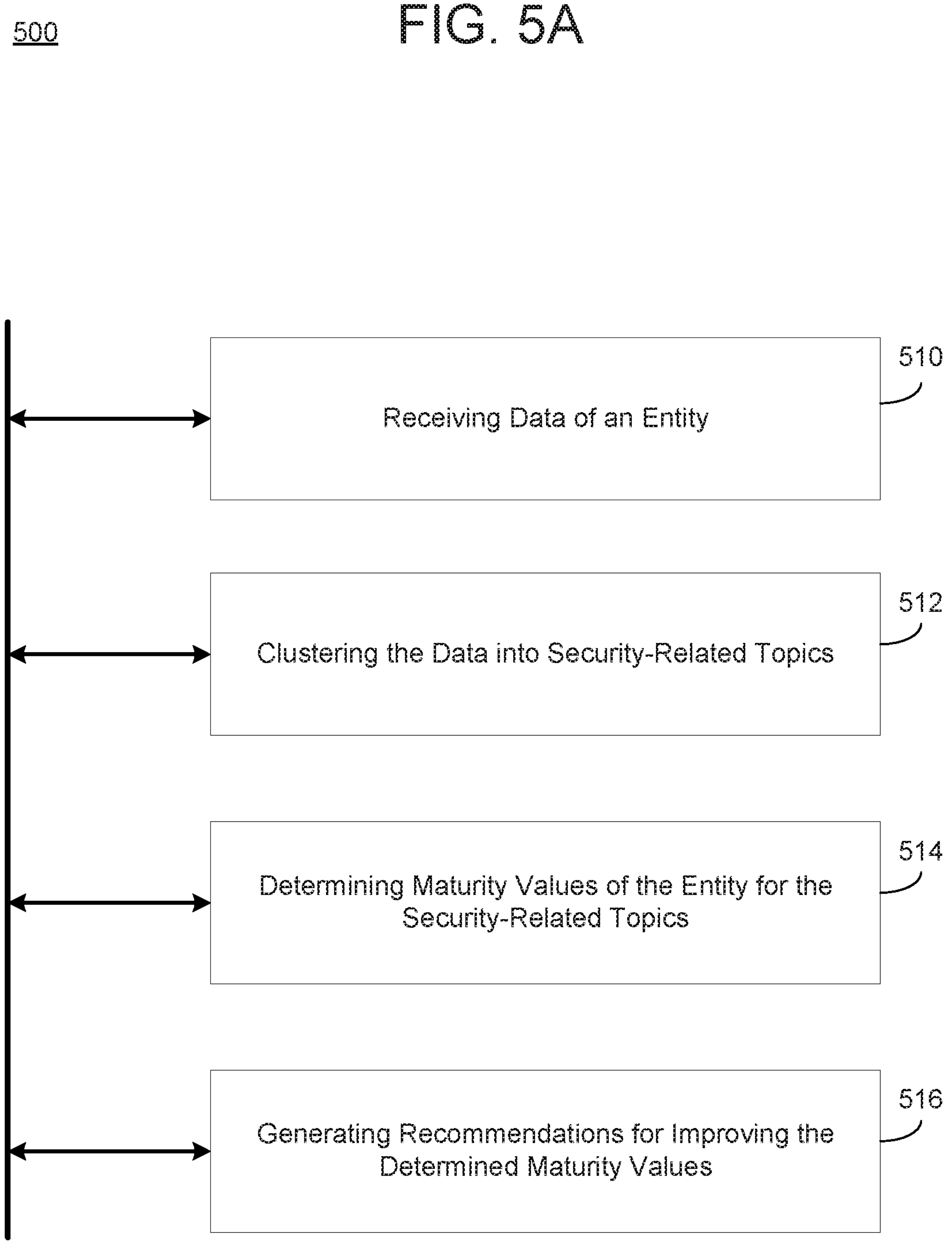
FIG. 5A is a diagram illustrating a method of determining maturity values of a cybersecurity system according to example embodiments.

FIG. 5A illustrates a method 500 of a method of determining maturity values of a cyber security system according to example embodiments. For example, the method 500 may be performed by a host system such as a cloud platform, a web server, an on-premises server, a user device, and the like. Referring to FIG. 5A, in 510 the method may include receiving data from a plurality of sources associated with an entity. The data sources may include information technology sources, enterprise software, log files, emails, instant messages, and the like. The data may be stored in files, documents, spreadsheets, etc.

In 512, the method may include clustering the data into a plurality of security-related topics. The security-related topics are not limited to any particular topics and may be designed by the particular entity. Examples of some possible security-related topics include network security, asset management, threat intelligence, data recovery, and the like. In some embodiments, the clustering may include converting unstructured text into vectors and categorizing (or placing in a particular class or group) each of the vectors into one of a plurality of predefined security-related topics via a natural language process.

In 514, the method may include determining, via one or more machine learning models, maturity values of the entity for the plurality of security-related topics, respectively. For example, the maturity values may be scores (e.g., arbitrary numeric values) that may include scaled outputs from the machine learning models. In 516, the method may include generating recommendations to improve the determined maturity values for the entity, wherein the maturity values relate to a level of security of the entity with respect to the security-related topics.

In some embodiments, the determining may include determining, via the one or more machine learning models, the maturity values based on a frequency of conversation about the plurality of security-related topics and a sentiment analysis of the plurality of security-related topics. In some embodiments, the determining may include determining, via the one or more machine learning models, individual maturity values of a security-related topic for each of people, processes, and technology. In these examples, a determined maturity value may include a score that represents a state of maturity of the entity with respect to best practices of an industry which includes the entity.

In some embodiments, the method may further include updating the data from the plurality of sources with new data, and determining, via the one or more machine learning models, updates to the maturity values of the entity for the plurality of security-related topics based on the updated data. In some embodiments, the method may further include outputting the recommendations for display via a user interface.

In some embodiments, for each security-related topic, the clustering may further include identifying a maturity component and a capability component for the respective security-related topic. In this example, the method may further include plotting identifiers of the security-related topics onto a graph in which a first axis represents respective maturity components of the security-related topics and a second axis represents respective capability components of the security-related topics.

The current solution may be performed, in one embodiment, by an entity based on documentation and other data collected from its networks, users, and/or the environment. For example, documentation and current performance metrics may be stored by the organization in their local database. The database information may be stored in flat file by extracting unstructured pieces of information using a machine learning model (TFIDF and LDA-NLP algorithms). The current solution may also be performed, in another embodiment, via receipt of the documentation and other information by a host platform which outputs security related topics that have been matched and classified into data-assets by a machine learning model. The system may use a scraping tool and generate scores by comparing the performance metrics identified from documentation and/or system operations with the standards/baseline found from ideal values pertaining to respective security topics. The system may also perform continuous ingestion of data as changes occur in security measures, agreements or files, for example. The updated data may again be digested into the model of the cognitive system along with feedback from other clients/customers (captured, for example, from chat/email sources) to fine-tune the model output which is also running in conjunction to the above models running in parallel.

Figure 5B:
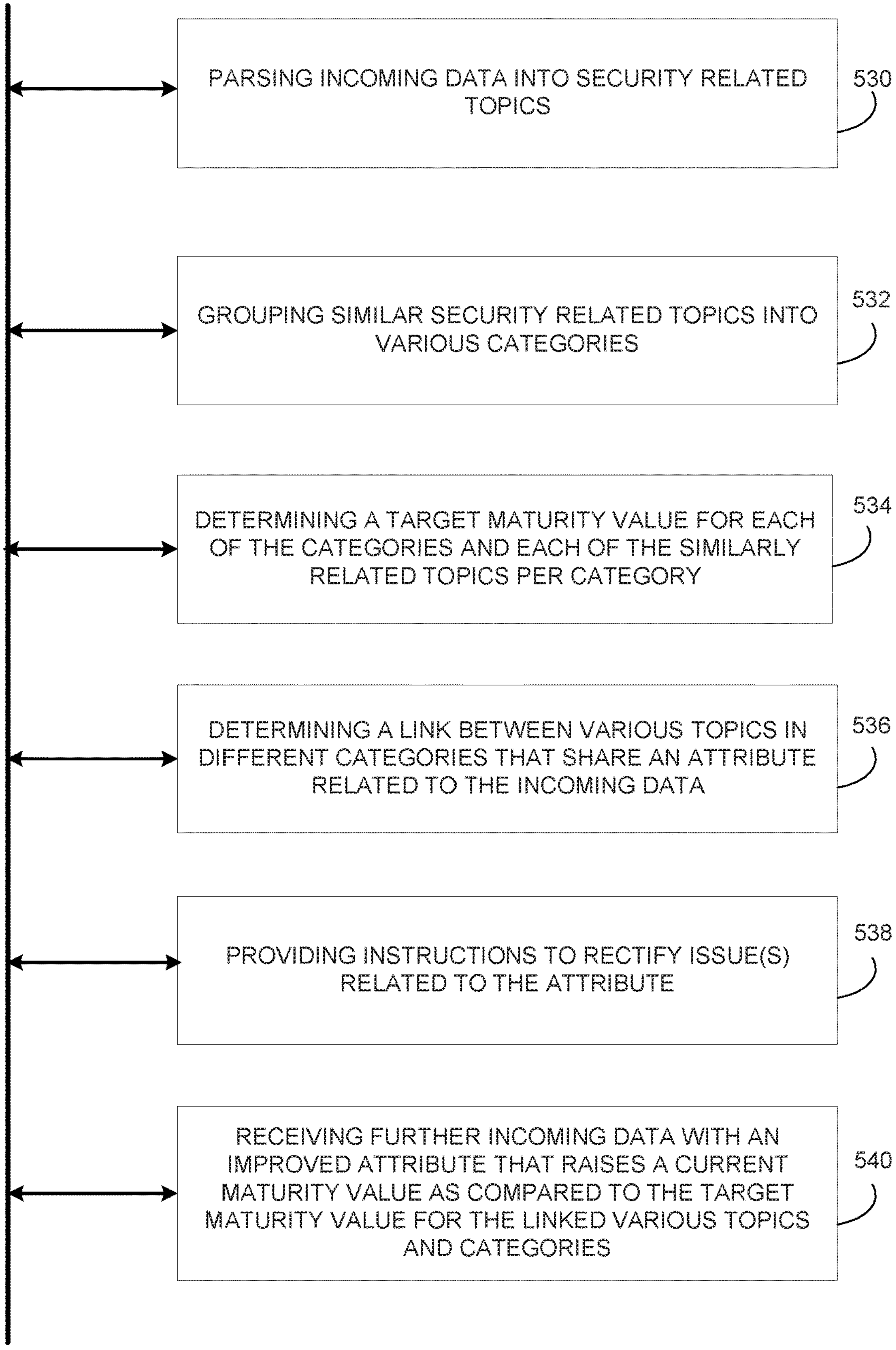
FIG. 5B is a diagram illustrating a method of providing recommendations and receiving additional data of an entity, according to example embodiments

FIG. 5B illustrates a method 520 of providing recommendations and receiving additional data of an entity, according to example embodiments. Referring to FIG. 5B, in 530, the method may include parsing incoming data into security-related topics. In 532, the method may include grouping similarly-related topics into various categories which each include one or more topics. In 534, the method may include determining a target maturity value for ach of the categories and each of the topics that are included in each of the categories. In 536, the method may include determining a link between topics in different categories that share an attribute related to the incoming data. In 538, the method may include providing instructions such as recommendations to rectify issues related to the attribute. Furthermore, in 540, the method may include receiving further incoming data of the entity which includes an improved attribute that raises the maturity value compared to the target maturity value for the linked various topics and categories.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
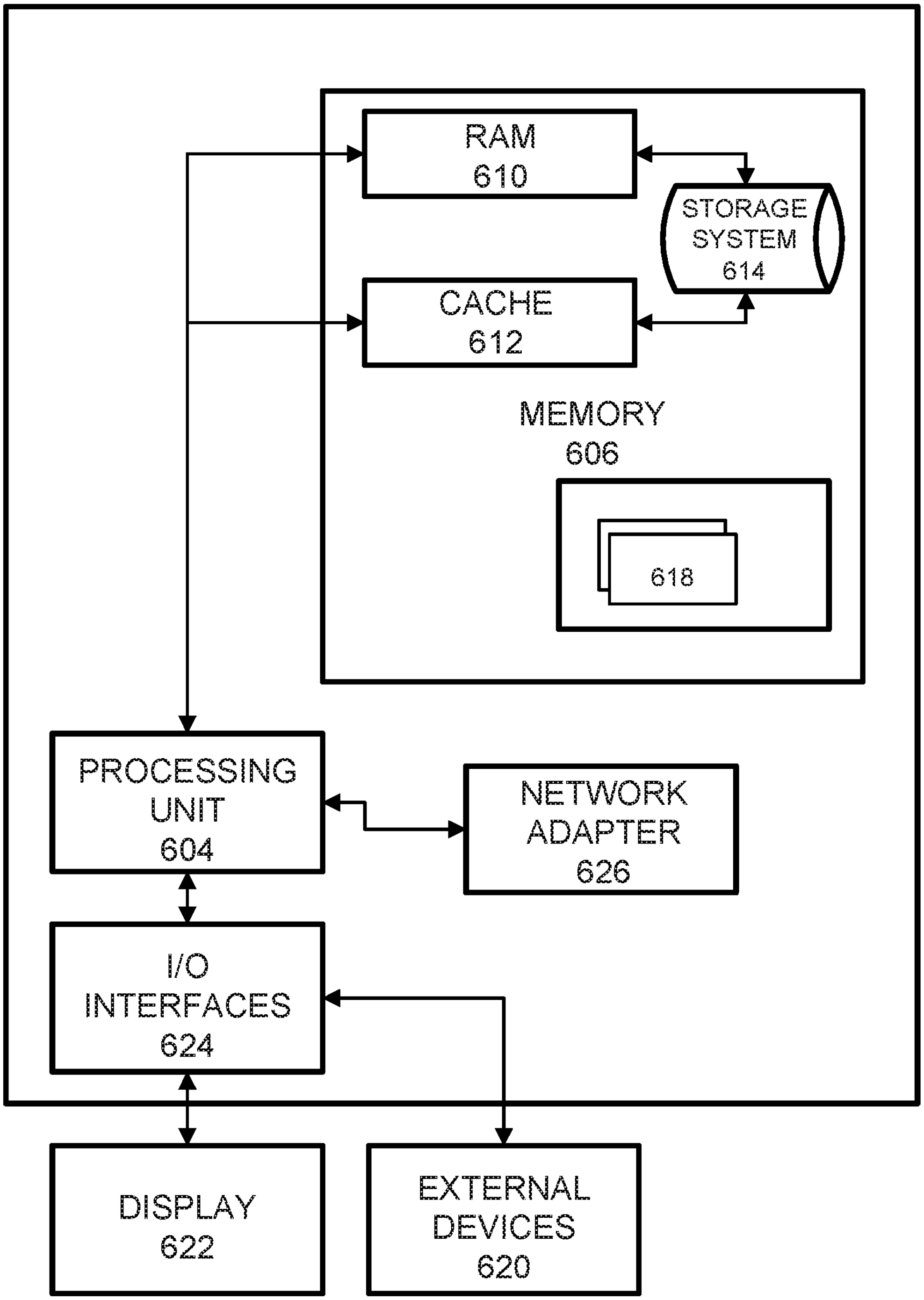
FIG. 6 is a diagram illustrating a computer system configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove. For example, the computing node 600 may be a network server of a larger enterprise network that connects multiple user workstations to the Internet, a private network, or the like.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units (processor) 604, a system memory 606, and a bus that couples various system components including the system memory 606 to the processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624 (which may be referred to herein as an output and/or an input). Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:

a processor configured to:

receive data from a plurality of sources associated with an entity;

cluster the data into security-related topics;

determine, via one or more machine learning models, capability values of the entity for each of the security related topics, wherein the capability values correspond to capabilities of the entity with respect to the security related topics;

determine, via the one or more machine learning models, maturity values of the entity for each of the security-related topics, respectively, wherein the maturity values correspond to a level of security of the entity with respect to the security-related topics, respectively;

generate overall values based on the capability values and the maturity values; and generate and output recommendations to improve the determined maturity values of the entity based on the overall values.

2. The apparatus of claim 1, wherein the processor is configured to convert unstructured text from the received data into vectors and categorize each of the vectors into one of the security-related topics via a natural language process.

3. The apparatus of claim 1, wherein the processor is configured to determine, via the one or more machine learning models, the maturity values based on a frequency of use of keywords associated with the security-related topics and a sentiment analysis of the keywords.

4. The apparatus of claim 1, wherein the processor is configured to determine, via the one or more machine learning models, individual maturity values of the security-related topics for each of people, processes, and technology.

5. The apparatus of claim 1, wherein the processor is further configured to receive updated data from the plurality of sources, and determine, via the one or more machine learning models, updates to the maturity values of the entity for the security-related topics based on the updated data.

6. The apparatus of claim 1, wherein a determined maturity value comprises a score that represents a state of practice of the entity with respect to best practices of an industry for a security-related topic.

7. The apparatus of claim 1, wherein the processor is further configured to output the generated recommendations for display.

8. The apparatus of claim 1, wherein the processor is further configured to plot an identifier of each security-related topic onto a graph in which a first axis represents a respective maturity value of the security-related topic and a second axis represents a respective capability value of the security-related topic.

9. A method comprising:

receiving data from a plurality of sources associated with an entity;

clustering the data into security-related topics;

determining, via one or more machine learning models, capability values of the entity for each of the security related topics, wherein the capability values correspond to capabilities of the entity with respect to the security related topics;

determining, via the one or more machine learning models, maturity values of the entity for each of the security-related topics, respectively, wherein the maturity values correspond to a maturity of the entity with respect to the security-related topics, respectively;

generating overall values based on the capability values and the maturity values; and generating and outputting recommendations to improve the determined maturity values of the entity based on the overall values.

10. The method of claim 9, wherein the clustering comprises converting unstructured text from the received data into vectors and categorizing each of the vectors into one of the security-related topics via a natural language process.

11. The method of claim 9, wherein the determining comprises determining, via the one or more machine learning models, the maturity values based on a frequency of use of keywords associated with the security-related topics and a sentiment analysis of the keywords.

12. The method of claim 9, wherein the determining comprises determining, via the one or more machine learning models, individual maturity values of the security-related topics for each of people, processes, and technology.

13. The method of claim 9, further comprising updating the data from the plurality of sources, and determining, via the one or more machine learning models, updates to the maturity values of the entity for the security-related topics based on the updated data.

14. The method of claim 9, wherein a determined maturity value comprises a score that represents a state of practice of the entity with respect to best practices of an industry for a security-related topic.

15. The method of claim 9, further comprising outputting the generated recommendations for display.

16. The method of claim 9, further comprising plotting identifiers of each security-related topic onto a graph in which a first axis represents a respective maturity value of the security-related topic and a second axis represents a respective capability value of the security-related topic.

17. A non-transitory computer-readable medium comprising instructions, that when read by a processor, cause the processor to perform a method comprising:

receiving data from a plurality of sources associated with an entity;

clustering the data into security-related topics;

determining, via one or more machine learning models, capability values of the entity for each of the security related topics, wherein the capability values correspond to capabilities of the entity with respect to the security related topics;

determining, via the one or more machine learning models, maturity values of the entity for the security-related topics, respectively, wherein the maturity values correspond to a maturity of the entity with respect to the security-related topics, respectively;

generating overall values based on the capability values and the maturity values; and generating and outputting recommendations to improve the determined maturity values of the entity based on the overall values.

18. The non-transitory computer-readable medium of claim 17, wherein the determining comprises determining, via the one or more machine learning models, the maturity values based on a frequency of use of keywords associated with the security-related topics and a sentiment analysis of the keywords.

* * * * *